J. B. McRAE.
STONE-QUARRYING MACHINE.

No. 193,171. Patented July 17, 1877.

WITNESSES:
C. Neveux
J. H. Scarborough

INVENTOR:
J. B. McRae
BY Munn
ATTORNEYS.

UNITED STATES PATENT OFFICE.

JOHN B. McRAE, OF MOUNT HOLLY, ARKANSAS.

IMPROVEMENT IN STONE-QUARRYING MACHINES.

Specification forming part of Letters Patent No. 193,171, dated July 17, 1877; application filed May 6, 1877.

*To all whom it may concern:*

Figure 1:
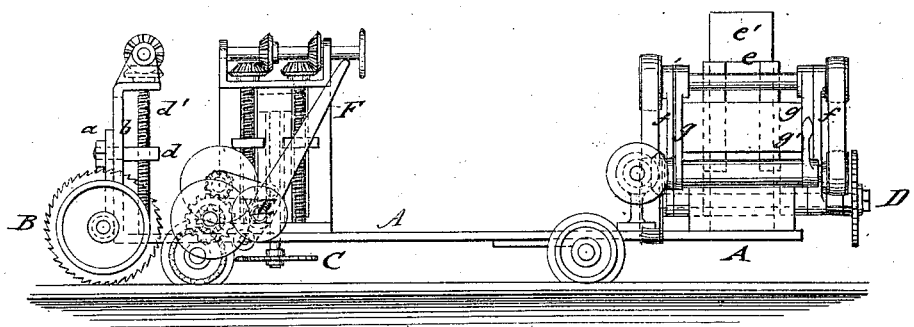
Figure 2:
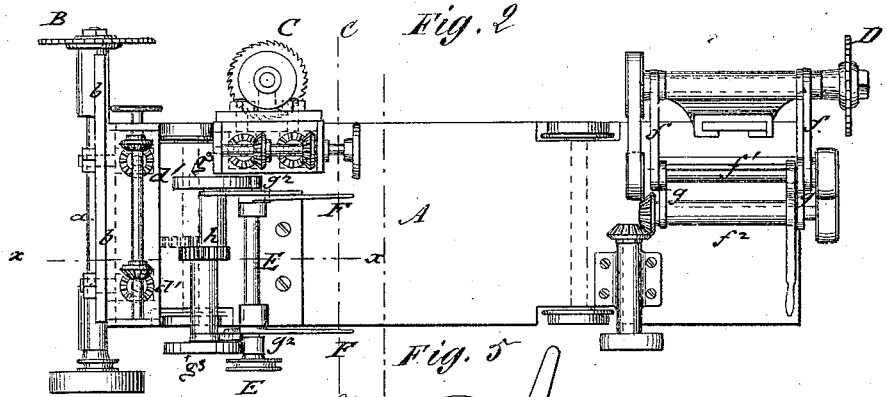
Figure 3:
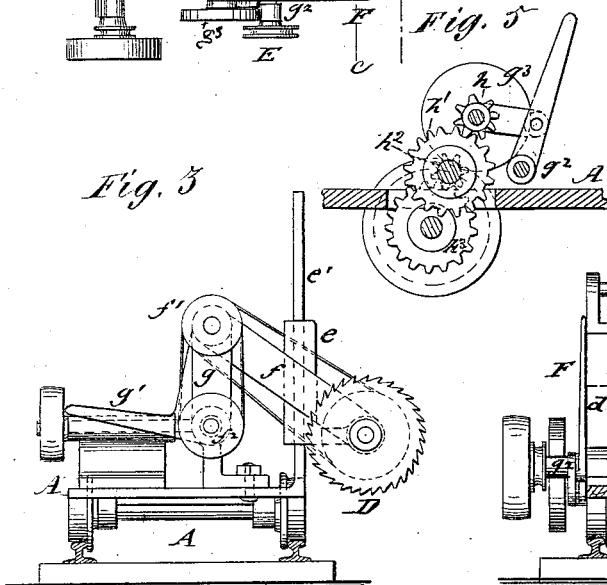
Figure 4:
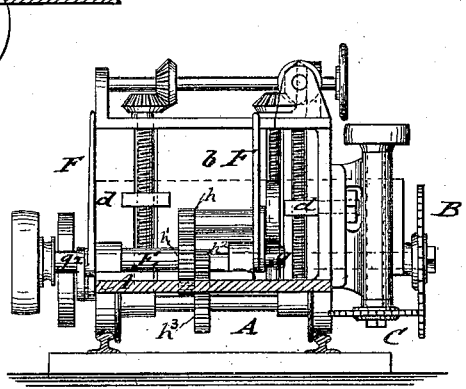

Be it known that I, JOHN B. McRAE, of Mount Holly, in the county of Union and State of Arkansas, have invented a new and Improved Stone-Quarrying Machine, of which the following is a specification:

In the accompanying drawing, Figure 1 represents a side elevation of my improved stone-quarrying machine; Fig. 2, a plan view; Fig. 3, a rear elevation; Fig. 4, a vertical longitudinal section of the same on the line $x\,x$, Fig. 2; and Fig. 5 shows a detail side view of the gearing to feed the machine forward.

Similar letters of reference indicate corresponding parts.

The object of this invention is to work the large quarries of soft white stone which are found in Texas and other States, and which produce a very useful building material, by a machine which is designed to cut the stone in the quarry directly into blocks of the required size in a quicker and more economical manner than with the present slow and tedious methods of quarrying them; and the invention consists of a car with a steam-engine or other motor driving a vertical and adjustable front saw, a horizontal and adjustable saw back of the same, and a third vertical rear saw, at right angles to the front saw, to divide the long pieces of stone cut from the bed into blocks of the required size. The rear saw is made vertically adjustable by a suitable lever-and-guide arrangement.

In the drawing, A represents a car of suitable size, that is propelled to the place of work on a track laid in the quarry. The car is provided with a steam-engine or other motor, by which the cutting-saws are revolved and the car moved forward while the machine is in operation. The car is moved up along the bed of stone as the cutting progresses. At the front part of the car is placed a vertical saw, B, of suitable diameter, that cuts down into the bed of stone, being capable of adjustment to different elevations by sliding the supporting-plate $a$ of the journal-bearings of the saw-shaft along a slotted vertical guide-plate, $b$, by means of traveling nuts $d$ guided in slots of the plate $b$, and passing over upright screw-bolts $d'$, which are turned by suitable gearing and belt-and-pulley connection with the motor. Back of the circular front saw B is a second circular saw, C, arranged in horizontal position, so as to cut on a plane at right angle to the vertical cut of the front saw. The shaft of the horizontal saw C turns in bearings of a supporting-plate that is vertically adjustable, in similar manner as the front saw, so as to set the horizontal saw higher or lower to correspond to the elevation of the front saw.

At the rear end of the car is arranged a third circular saw, D, supported in vertical position, but at right angles to the front saw, so as to cut the long piece of stone sawed off by the joint action of the front saws into blocks of proper lengths. This is accomplished while the machine is backed to the starting-point ready for the next forward cutting.

The shaft of the rear saw D turns in bearings of a vertically-sliding frame, $e$, that is guided along an upright support, $e'$, the shaft being hung at the same time to levers $f$ of an intermediate shaft, $f'$, turning in bearings of a fulcrumed lever-frame, $g$, operated by a hand-lever, $g^1$, for the purpose of raising the saw D to any required height, simultaneously with the revolving of the same by belt-and-pulley connection of the saw-shaft, intermediate shaft, and a shaft, $f^2$, at the fulcrum of the lever-frame, said shafts obtaining motion by belt and pulley connecting with the steam-engine, as shown in Fig. 3.

The front saws B and C are fed forward for cutting uniformly into the bed of stone by belt-and-pulley connection of a feed-shaft, E, with the shaft of front saw, the feed-shaft working by friction-pulleys $g^2$ at each end engaging with friction-pulleys $g^3$, and suitable transmitting-shafts, carrying at their inner ends gear-wheels $h\,h$, meshing with each other, and on the same shaft with wheel $h^1$, an additional wheel, $h^2$, meshing with wheel $h^3$ on the front axle, and propelling thereby the car in proportion to the cutting action of the saws.

The feed-motion may at any time be interrupted by means of levers F, that throw the friction-pulleys out of contact with the feed-shaft.

The sawing-machine is run on the track alongside the bed of stone, cutting first a piece of suitable length by the vertical and horizontal front saw, which piece is again cut into blocks by the vertically-movable cross-cutting saw at the rear part of the car. The position of the track is then changed up to the bed after the blocks are removed, and the same operation is repeated, admitting in this manner the rapid and more economical quarrying of the stone referred to by the present methods.

Having thus described my invention, what I claim as new, and desire to secure by Letters Patent, is—

1. In a stone-quarrying machine, the vertically and horizontally cutting circular front saws B and C being vertically adjustable to different elevations by sliding supporting-frames, slotted guide-standards, traveling-nuts, and actuating screw-bolts, substantially as and for the purpose specified.

2. The shaft of the circular rear saw, sliding by its supporting-frame along a vertical guide-standard, in combination with the fulcrumed lever-frames $f f^1$ and $g g^1$, and with intermediate shafts and pulley and belt connections to revolve the saw simultaneously with raising the same, substantially as specified.

3. The combination of the front saw-shaft, feed-shaft E, friction-pulleys, operating-levers, and transmitting-gear with cog-wheel of front axle of car, to move the car forward for feeding the saws, substantially as described.

JOHN B. McRAE.

Witnesses:
A. S. MORGAN,
P. L. THORNTON.